(12) United States Patent  
Yoshizawa

(10) Patent No.: US 8,675,095 B2  
(45) Date of Patent: Mar. 18, 2014

(54) IMAGE DATA PROCESSING SYSTEM FOR TRANSFERING IMAGE DATA BETWEEN DEVICES

(75) Inventor: Daisuke Yoshizawa, Ome (JP)

(73) Assignee: Nikon Corporation, Tokyo (JP)

( * ) Notice: Subject to any disclaimer, the term of this patent is extended or adjusted under 35 U.S.C. 154(b) by 250 days.

(21) Appl. No.: 13/043,868

(22) Filed: Mar. 9, 2011

(65) Prior Publication Data

US 2011/0221912 A1    Sep. 15, 2011

(30) Foreign Application Priority Data

Mar. 10, 2010  (JP) ................................ 2010-053526  
Feb. 22, 2011  (JP) ................................ 2011-035858

(51) Int. Cl.  
*H04N 5/76*    (2006.01)

(52) U.S. Cl.  
USPC ................. 348/231.2; 348/211.1; 348/333.05

(58) Field of Classification Search  
USPC ................... 348/207.1, 207.11, 211.1, 231.2, 348/333.05  
See application file for complete search history.

(56) References Cited

U.S. PATENT DOCUMENTS

| | | | |
|---|---|---|---|
| 2003/0122940 A1* | 7/2003 | Myojo ...................... | 348/231.2 |
| 2004/0169730 A1* | 9/2004 | Tamura et al. ........... | 348/333.04 |
| 2006/0112413 A1* | 5/2006 | Ando et al. .................... | 725/105 |
| 2008/0134070 A1* | 6/2008 | Kobayashi et al. ........... | 715/767 |
| 2009/0122159 A1* | 5/2009 | Sakaue et al. ............ | 348/333.01 |
| 2009/0207279 A1 | 8/2009 | Ochi et al. | |

FOREIGN PATENT DOCUMENTS

JP    A-2009-213150    9/2009

* cited by examiner

*Primary Examiner* — Gevell Selby  
(74) *Attorney, Agent, or Firm* — Oliff PLC

(57) ABSTRACT

An image data processing system transfers image data, stored in an image file and corresponding to independent images, from a first device to a second device. The first device includes data output, image file generation, and transfer processing units. The second device includes a specification data generation unit. The data output unit outputs combined miniaturized image data. The combined miniaturized image data shows combined miniaturized images. The miniaturized images correspond to the independent images. Each miniaturized image has a smaller data volume than the independent image. The specification data generation unit generates transfer subject specification data from the combined miniaturized image data. The transfer subject specification data specifies data corresponding to a transfer subject independent image. The image file generation unit generates a transfer image file storing the transfer subject image data. The transfer processing unit transfers the transfer image file to the second device.

9 Claims, 11 Drawing Sheets

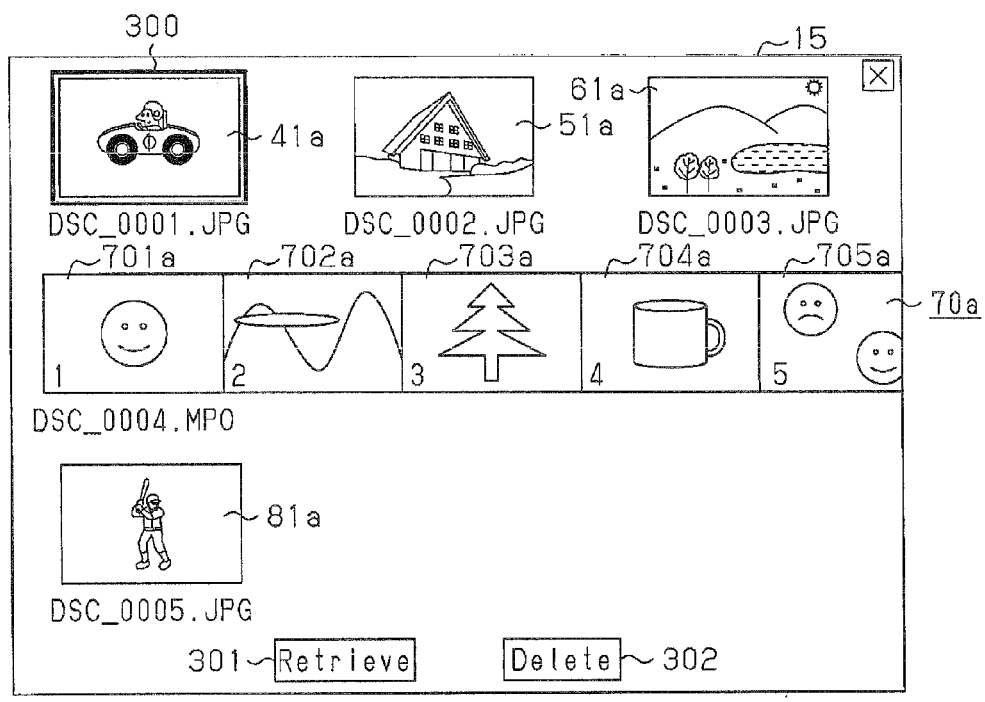
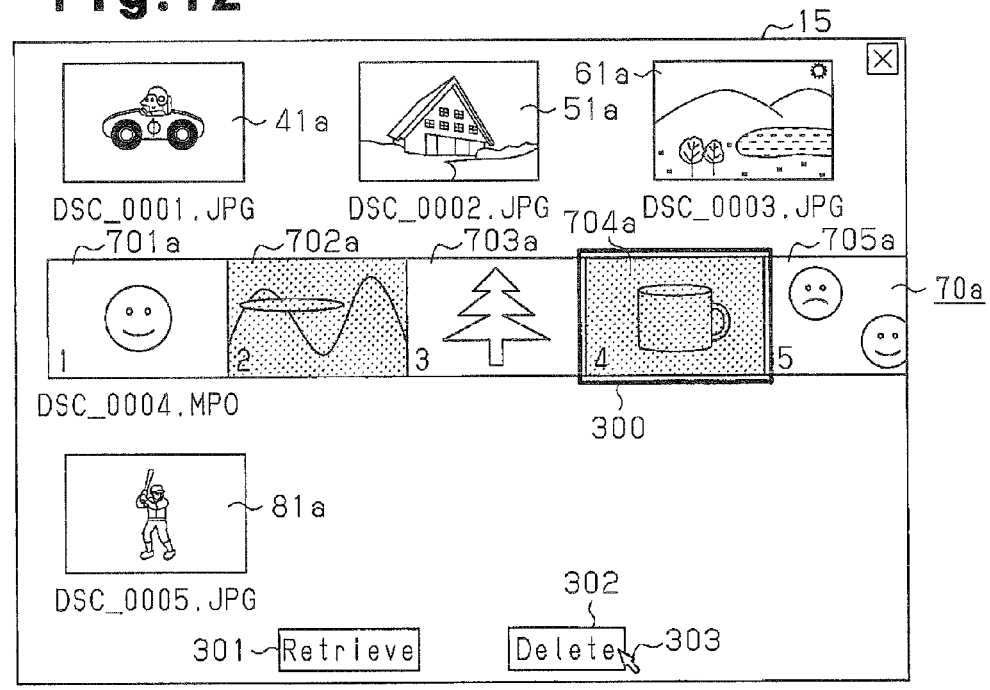

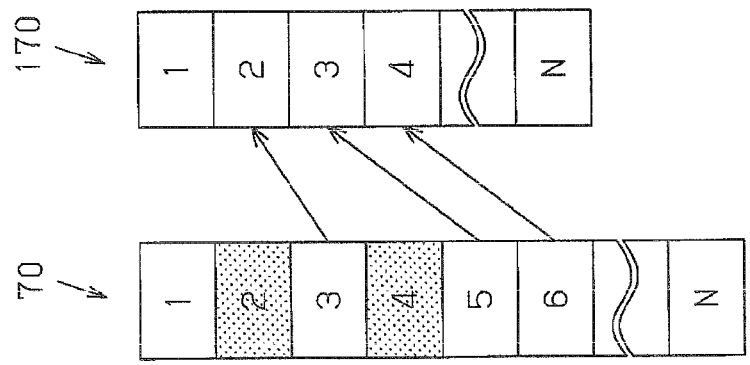

| File Name | Image No. | Evaluation |
|---|---|---|
| DSC_0001.JPG | → | |
| DSC_0002.JPG | → | X |
| DSC_0003.JPG | → | X |
| DSC_004.MPO | 1 | |
| | 2 | X |
| | 3 | |
| | 4 | |
| | 5 | |
| | ⋮ | |
| | N | |
| DSC_0005.JPG | → | |

IMAGE DATA PROCESSING SYSTEM FOR TRANSFERING IMAGE DATA BETWEEN DEVICES

CROSS-REFERENCE TO RELATED APPLICATIONS

This application is based upon and claims the benefit of priority from prior Japanese Patent Application Nos. 2010-53526, filed on Mar. 10, 2010, and 2011-035858, filed on Feb. 22, 2011, the entire contents of which are incorporated herein by reference.

BACKGROUND OF THE INVENTION

The present invention relates to an image data processing system that transfers image data from a first device to a second device.

Recent digital still cameras (hereinafter simply referred to as cameras) use a recording technique that stores image data for a plurality of images in relation with one another in a single file (refer, for example, to Japanese Laid-Open Patent Publication No. 2009-213150). Such a recording technique is referred to as a multi-picture (MP) format, and an image file generated in accordance with the recording technique is referred to as a multi-picture (MP) file.

SUMMARY OF THE INVENTION

Image data for a plurality of images stored in an MP file may be transferred from a camera to a personal computer (PC) by a USB cable or the like. This allows the image data to be processed by the PC.

However, compared with a single picture (SP) file that stores image data for a single image in a single image file, an MP file has a larger data volume since image data for a plurality of images are stored in a single image file. This increases the load for transferring the file.

Further, when the image data for the plurality of images in an MP file is transferred one by one for each image, the transfer time is relatively long. Moreover, unnecessary image data is also transferred. This lowers the data processing efficiency. Such a problem occurs not only when an MP file is transferred from a camera to a PC but also when transferring an MP file to other devices.

One aspect of the present invention is an image data processing system including a first device and a second device. The first device transfers image data from an image file, which stores image data corresponding to a plurality of independent images, to the second device. The first device includes a data output unit, an image file generation unit, and a transfer processing unit. The second device includes a specification data generation unit. The data output unit outputs combined miniaturized image data to the second device in response to a transfer request for image data. The combined miniaturized image data is used to show a plurality of miniaturized images in a combined state. The plurality of miniaturized images respectively correspond to the plurality of independent images in the image file. Each of the miniaturized images has a smaller data volume than the corresponding independent image. The specification data generation unit generates transfer subject specification data based on the output combined miniaturized image data. The transfer subject specification data specifies transfer subject image data that corresponds to a transfer subject independent image. The image file generation unit generates a transfer image file storing the transfer subject image data based on the generated transfer subject specification data. The transfer processing unit transfers the transfer image file to the second device.

Another aspect of the present invention is an image data processing program executed by an image data processing device that transfers image data from an image file, which stores image data corresponding to a plurality of independent images, the program when executed causing a controller of the image data processing device to perform the steps comprising: outputting combined miniaturized image data to an external device in response to a transfer request for image data, wherein the combined miniaturized image data combines a plurality of miniaturized images respectively corresponding to the plurality of independent images in the image file, and each of the miniaturized images has a smaller data volume than the corresponding independent image; receiving, with the external device, specification information specifying transfer subject image data and generated based on the combined miniaturized image data; generating, from the image file, a transfer image file including the transfer subject image data specified by the specification information; and transferring the transfer image file to the external device.

A further aspect of the present invention is an image data processing device that transfers image data from an image file, which stores image data corresponding to a plurality of independent images, the device comprising: a data output unit that outputs combined miniaturized image data to an external device in response to a transfer request for image data, wherein the combined miniaturized image data combines a plurality of miniaturized images respectively corresponding to the plurality of independent images in the image file, and each of the miniaturized images has a smaller data volume than the corresponding independent image; a reception unit that receives, from the external device, specification information specifying transfer subject image data and generated based on the combined miniaturized image data; an image file generation unit that generates, from the image file, a transfer image file including the transfer subject image data specified by the specification information; and a transfer unit that transfers the transfer image file to the external device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a diagram showing an initial screen on a PC display in a specification data generation step;

FIG. 12 is a diagram showing an intermediate screen on the PC display in a specification data generation step;

FIG. 13 is a list for specifying a transfer subject;

FIG. 14 is a diagram comparing the data structures of an MP file and a transfer image file;

DESCRIPTION OF THE INVENTION

First Embodiment

A first embodiment of an image data processing system including a digital still camera (hereinafter referred to as "the camera"), which serves as an image capturing device, will now be discussed with reference to FIGS. 1 to 14.

Figure 1:
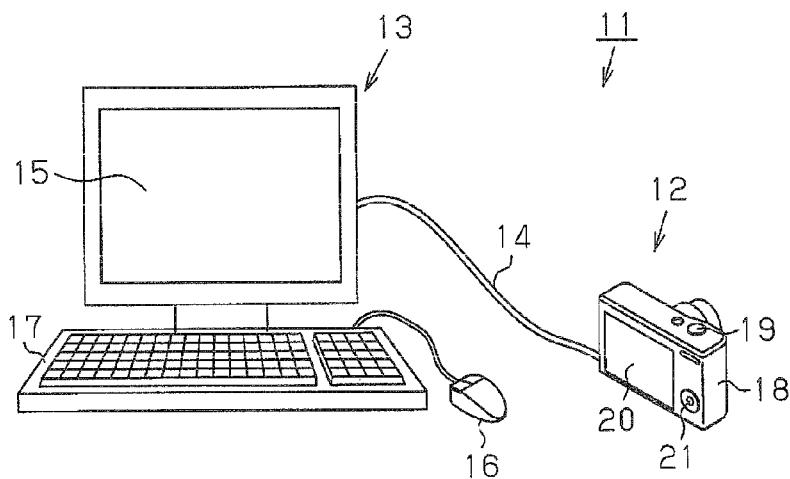
FIG. 1 is a perspective view showing an image data processing system according to a first embodiment of the present invention.

As shown in FIG. 1, in the present embodiment, an image data processing system 11 includes a camera 12, a personal computer (hereinafter referred to as "the PC") 13, and a USE cable 14, which connects the camera 12 and the PC 13 in a data communicable manner. In the image data processing system 11, image data is transferred from the camera 12 to the PC 13 by the USB cable 14. An image of the image data transferred from the camera 12 is shown on a display 15 of the PC 13. A user may use an external operation unit such as a mouse 16 or a keyboard 17 to process the image data of the image shown on the display 15. The camera 12 is one example of a first device, or a transferrer of an image file. The PC 13 is one example of a second device, a receiver of an image file or a transfer destination of an image file.

The camera 12, which originates the transferred image data, includes a camera body 18, which is generally box-shaped, as shown in FIG. 1. The camera body 18 includes an upper surface, on which a shutter button 19 is arranged, and a rear surface, on which a tetragonal liquid crystal display monitor (hereinafter referred to as "the monitor") 20 and a selection button 21 are arranged. The user operates the selection button 21 to change the contents shown on the monitor 20 or to change various settings of the camera 12.

Figure 2:
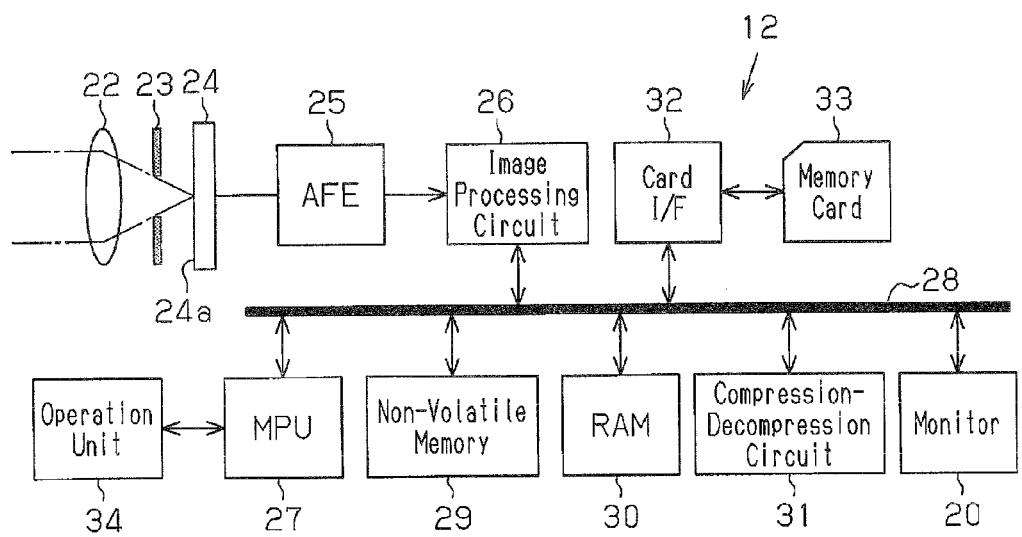
FIG. 2 is a block diagram of a digital still camera.

As shown in FIG. 2, the camera 12 includes a lens unit 22, a diaphragm 23, and an image capturing element 24. The lens unit 22 includes a plurality of lenses such as a zoom lens (only one lens shown in FIG. 2 for the sake of brevity). The diaphragm 23 adjusts the amount of light from an object of which an image is captured that passes through the lens unit 22. The image capturing element 24 generates an image of the captured object light that passes through the diaphragm 23 on an incident surface, or light reception plane 24a, which serves as an image capturing plane. The image capturing element 24 includes an output terminal connected to an analog front end (AFE) 25 and an image processing circuit 26 in series. The image processing circuit 26 is connected to a micro-processing unit (MPU) 27, which functions as a controller, by a data bus 28.

The data bus 28 also connects the MPU 27 to a non-volatile memory 29, a RAM 30, a compression-decompression circuit 31, the monitor 20, and a card interface (I/F) 32. The non-volatile memory 29 stores programs for processing image data, programs for controlling the camera 12, and the like. The RAM 30 functions as a buffer memory. The compression-decompression circuit 31 compresses and decompresses image data. A memory card 33, which is a recording medium, is connected in a removable manner to the card I/F 32. Further, the MPU 27 is data communicable with operation members 34, which include the shutter button 19, the selection button, and a mode switching button operated by the user of the camera 12. Each operation member 34 provides the MPU 27 with an operation signal (mode switching signal, half press operation signal, and the like).

The image capturing element 24 is formed by a complementary metal oxide semiconductor (CMOS) image sensor or a charge coupled device image sensor and includes an electronic shutter function. The image capturing element 24 includes a light reception plane 24a, on which a two-dimensional array of light reception elements is arranged. The image capturing element 24 stores signal charges corresponding to the image of the captured object generated on the light reception plane 24a. Further, the image capturing element 24 generates an analog pixel signal corresponding to the stored signal charges and provides the analog pixel signal to the AFE 25.

The AFE 25 includes a signal processing unit and an A/D conversion unit (not shown). The signal processing unit samples the analog pixel signal received from the image capturing element 24 at a predetermined timing (correlated double sampling). Then, the signal processing unit amplifies the sampled analog pixel signal to a predetermined signal level based on, for example, ISO sensitivity. The A/D conversion unit (not shown) converts the amplified pixel signal into a digital signal to generate image data that is provided to the image processing circuit 26.

The image processing circuit 26 performs various types of image processing (e.g., white balance processing) on the image data received from the AFE 25 based on a control signal from the MPU 27. Then, the image processing circuit 26 temporarily stores the image data, which has undergone such image processing, in the RAM 30 based on a control signal from the MPU 27. When the shutter button 19 is fully pressed, the image processing circuit 26 shows an image, which corresponds to the present image data, on the monitor 20 so that the image can be checked.

The MPU 27 centrally controls various processes and operations (e.g., shooting and recording) of the camera 12 based on the control programs stored in the non-volatile memory 29. The data bus 28 functions as a transfer path for various types of data resulting from the control executed by the MPU 27. For recording, the compression-decompression circuit 31 performs Joint Photographic Exports Group (JPEG) compression in the image data stored in the RAM 30 to generate compressed image data for recording. For reproduction, the compression-decompression circuit 31 performs JPEG decompression on the compressed image data to generate the original non-compressed image data.

Figure 3:
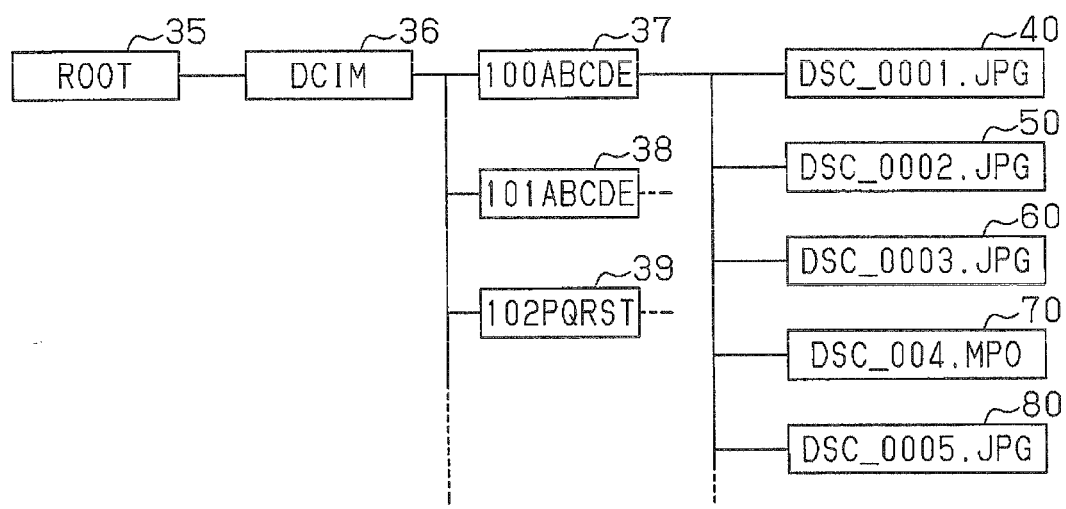
FIG. 3 is a directory chart of a memory card.

The MPU 27 records additional image file information, such as a file name and date and time of the captured image, to the data compressed by the compression-decompression circuit 31 to generate an image file that is recorded to the memory card 33. As shown in FIG. 3, a root directory 35 of the memory card 33 includes a DCIM directory 36, which implements a recording technique in compliance with the Design Rule for Camera File System (DCF) standard. A plurality of DCF directories 37, 38, 39 having directory names such as "100ABCDE", "101ABCDE", and "102PQRST" are arranged immediately under the DCIM directory 36.

The DCF directory 37, which is named "100ABCDE", includes a plurality of image files, each recorded with a unique file name. More specifically, the DCF directory 37 named "100ABCDE" includes four SP files 40, 50, 60, and 80 and a single MP file 70. The SP files 40, 50, 60, and 80 are respectively named "DSC_0001.JPG", "DSC_0002.JPG", "DSC_0003.JPG", and "DSC_0005.JPG". The MP file 70 is named "DSC_0004.MPO". An image file including the extension of ".JPG" is a single picture (SP) file that stores image data for a single image. An image file including the extension of ".MPO" is a multi-picture file that stores image data for a plurality of images in relation with one another.

The mode switching button (not shown), which is one of the operation members 34, is operated to switch operation modes of the camera 12. For example, the mode switching button is operated when switching between a shooting mode and a reproduction mode and when switching between a normal shooting mode and a special shooting mode (non-normal image shooting such as continuous shooting, panoramic shooting, and multi-view shooting).

Figure 4:
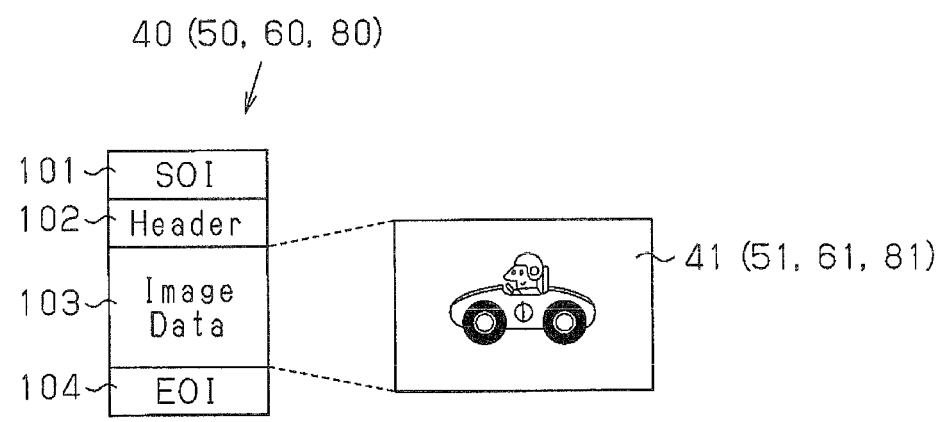
FIG. 4 is a schematic diagram showing the data structure of an SP file.

When the shutter button 19, which is one of the operation members 34, is fully pressed in the normal shooting mode, as shown in FIG. 4, the SP file 40 (50, 60, 80) is generated by compressing data for a single image. Then, the MPU 27 records the SP file in the memory card 33. The SP file 40 (50, 60, 80) has a data structure formed by a start of image (SOI) marker 101, a header 102, image data 103, and an end-of-image (EOI) marker 104. The SOI marker 101 indicates the data head. Additional information such as the file name is written to the header 102. The image data 103 is the JPEG-compressed data for an independent image 41 (51, 61, 81). The EOI marker 104 indicates the end of the data. As shown in the example of FIG. 11, display image data for an SP thumbnail 41a (51a, 61a, 81a), which serves as a miniaturized image, is recorded in correspondence with the SP independent image 41 (51, 61, 81) as tag information in the header 102.

Figure 5:
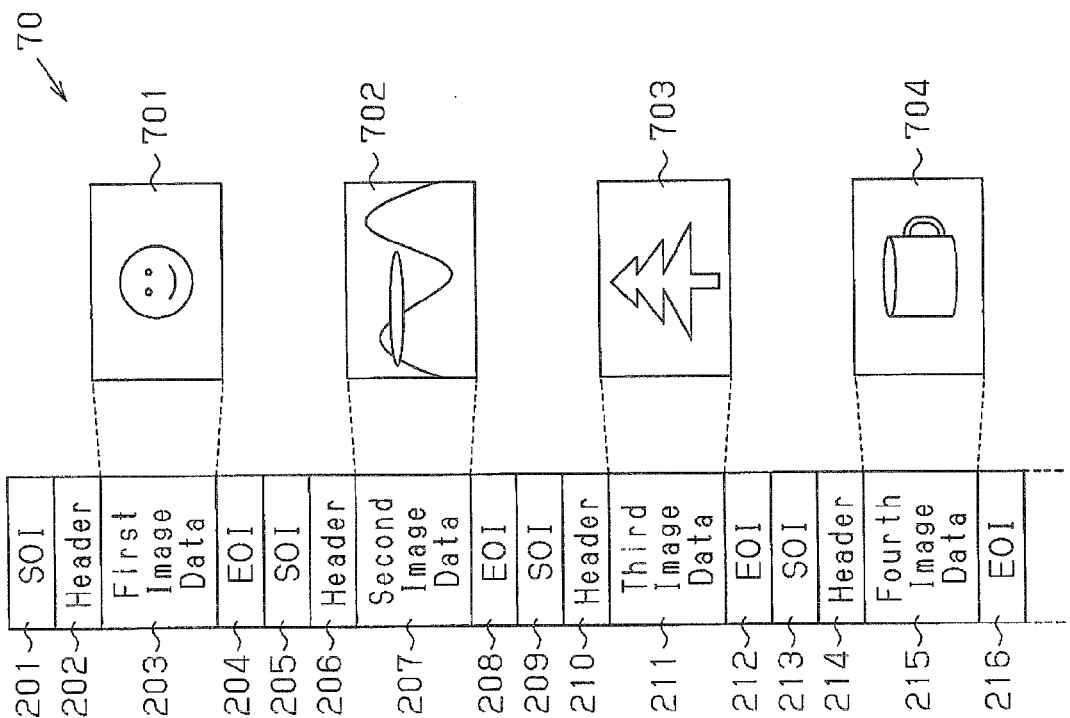
FIG. 5 is a schematic diagram showing the data structure of an MP file.

The shutter button 19, which is one of the operation members 34, may also be fully pressed in a special shooting mode. In such a case, as shown in FIG. 5, an MP file 70 is generated by compressing data for a plurality of images. Then, the MPU 27 records the MP file 70 to the memory card 33. The MPU 27 of the camera 12 functions as a data storing unit. The MP file 70 has a data structure that is basically formed by repetitively and continuously recording the data structure of an SP file for a number of times that is the same as the number of images that are to be recorded in the MP file 70.

More specifically, in the MP file 70, the first portion of the data structure is for a first independent image 701 and formed by an SOI marker 201, a header 202, image data 203, and an EOI marker 204. The SOI marker 201 indicates the head of the data portion. Additional information such as the file name is written to the header 202. The image data 203 is the JPEG-compressed data of the first independent image 701. The EOI marker 204 indicates the end of the data. Further, a second portion of the data structure is for a second independent image 702 and formed by an SOI marker 205, a header 206, image data 207, and an EOI marker 208. The SOI marker 205 indicates the head of the data portion. Additional information such as the file name is written to the header 206. The image data 207 is the JPEG-compressed data for the second independent image 702. The EOI marker 208 indicates the end of the data.

In the same manner, a third portion of the data structure is for a third independent image 703 and formed by an SOI marker 209, a header 210, image data 211, and an EOI marker 212. The SOI marker 209 indicates the head of the data portion. Additional information such as the file name is written to the header 210. The image data 211 is the JPEG-compressed data for the third independent image 703. The EOI marker 212 indicates the end of the data. A fourth portion of the data structure is for a fourth independent image 704 and formed by an SOI marker 213, a header 214, image data 215, and an EOI marker 216. The SOI marker 213 indicates the head of the data portion. Additional information such as the file name is written to the header 214. The image data 215 is the JPEG-compressed data for the fourth independent image 704. The EOI marker 216 indicates the end of the data.

The header 202 in the data structure section of the first independent image 701 at the beginning of the MP file 70 includes MP format appendage information, such as tag information, which indicates the entire structure from the first independent image 701 to the final independent image, and tag information, which is unique to the first independent image 701. The headers in the data structure sections for independent images other than the first independent image 701, such as the headers 206, 210, and 214 for the second, third, and fourth independent images 702, 703, and 704 each include relative information, which relates the corresponding independent image to the first independent image 701, and tag information, which is unique to the corresponding image. Referring to the example of FIG. 11, display image data for MP thumbnails 701a to 705a (miniaturized images) corresponding to the MP independent images 701 to 704 is recorded as tag information in each of the headers 202, 206, 210, and 214 of the independent images 701 to 704.

In the image data processing system 11 of the first embodiment, when image data is transferred between the camera 12 and the PC 13, the MPU 27 of the camera 12 and a CPU (not shown) of the PC 13 execute an image data processing routine. The routine will now be described with reference to FIGS. 6 to 9. The image data processing routine may be stored in advance as an image data processing program code in the camera 12 and the PC 13.

Figure 6:
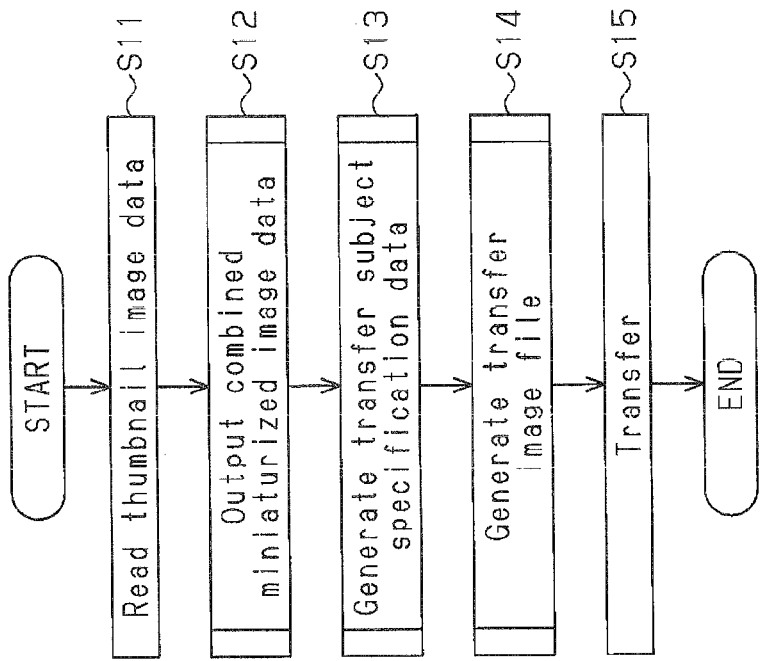
FIG. 6 is a flowchart of a routine for processing image data.

When the camera 12 and the PC 13 are in a data communicable state, the CPU of the PC 13 provides the MPU 27 of the camera 12 with a thumbnail request signal, which requests the transfer of the image data of a thumbnail (miniaturized image). In response to the thumbnail request, the image data processing routine shown in FIG. 6 is started. The thumbnail request signal may include ID information used to specify the image file of the requested thumbnail.

In step S11, the MPU 27 of the camera 12 uses the ID information designated by the thumbnail request signal to specify the image file of the requested thumbnail. Then, the MPU 27 reads the specified image file from the memory card 33, stores in the RAM 30 the image data of the images and thumbnails contained in the image file, and then proceeds to step S12.

In step S12, when the MPU 27 of the camera 12 determines that the read image file is the MP file 70, the MPU 27 generates data for a combined miniaturized image, which shows the thumbnails (miniaturized images) in a combined state, and then transmits the combined miniaturized image data to the PC 13. The specific contents of step S12 (data output step) will be described later in detail. The PC 13 may show the thumbnails arranged next to each other in a row, for example, based on the combined miniaturized image data.

In step S13, based on the combined miniaturized image data (or the image data for each miniaturized image) transmitted from the camera 12, the CPU of the PC 13 generates transfer subject specification data, which specifies the independent image corresponding to the image data that is subject to transfer. Then, the CPU transmits the transfer subject specification data to the camera 12. The specific contents of step S13 (transfer subject specification data generation step) will also be described later in detail.

In step S14, the MPU 27 of the camera 12 generates a transfer image file by selectively storing the image data of the transfer subject specified by the transfer subject specification data transmitted from the PC 13. The specific contents of step S14 (transfer image file generation step) will also be described later in detail. In step S15, the MPU 27 transfers the transfer image file to the CPU and then ends the image data processing routine.

The specific contents of step S12 will now be described with reference to the flowchart of FIG. 7, which shows a data output routine.

First, in step S21 of the data output routine, the MPU 27 of the camera 12 determines whether the image file of the requested thumbnail is an MP file. When a negative determination is made (step S21: NO), the MPU 27 proceeds to step S22 and generates display data for an SP thumbnail (e.g., the thumbnail 41a shown in FIG. 11). When an affirmative determination is made in step S21 (step S21: YES), the MPU 27 proceeds to step S23, which is an image data generation step, and generates display data (combined miniaturized image data) for the combined thumbnail 70a. Information that is required to be in compliance with the communication standard is added to the display data for each SP thumbnail and combined thumbnail. The information needs only be added to the display data for the combined thumbnail 70a and does not need to be added to each thumbnail in the combined thumbnail 70a.

In step S24, the MPU 27 transfers the display data of the generated thumbnail (SP thumbnail or combined thumbnail 70a) to the CPU of the PC 13 and then ends the data output routine. Step S24 corresponds to a transmission step for reading the image data of a miniaturized image from the MPU 27 (transmission unit) of the camera 12 (image data processor) and transmitting the image data to the CPU of the PC 13.

Figure 8:
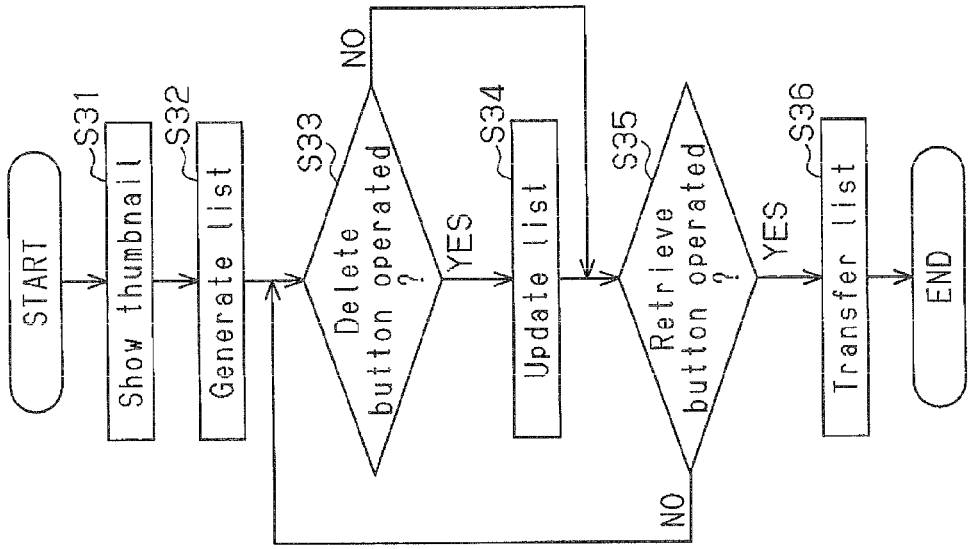
FIG. 8 is a flowchart of a routine for generating specification data.

Next, the specific contents of step S13 (specification data generation step) will be described in accordance with the specification data generation routine shown in FIG. 8. In the illustrated example, the PC 13 executes step S13.

First, in the specification data generation routine, in step S31, the CPU of the PC 13 shows images of thumbnails (thumbnail corresponding to each independent image of the SP thumbnail, the combined thumbnail 70a, and the MP file 70) on the display 15 based on the thumbnail display data transferred from the MPU 27 of the camera 12. In step S32, the CPU of the PC 13 generates a transfer subject specification list 400, which includes image information of each thumbnail shown on the display 15.

In step S33, the CPU of the PC 13 determines whether or not a delete button 302 (refer to FIGS. 11 and 12) has been operated. When an affirmative determination is made (step S33: YES), the CPU of the PC 13 proceeds to step S34 and updates the list that has already been generated. More specifically, in the transfer subject specification list 400 including the image information of each thumbnail shown on the display 15, whenever the delete button 302 is operated, the image information corresponding to the thumbnail in a framed cursor 300 (refer to FIGS. 11 and 12) is updated. The image information in the transfer subject specification list 400 is updated by marking a cross to a field corresponding to the number of the image selected to be deleted from the transfer subject. When the list 400 is updated, the CPU of the PC 13 proceeds to step S35.

When a negative determination is made in step S33 (step S33: NO), the CPU of the PC 13 proceeds to step S35. In step S35, the CPU of the PC 13 determines whether or not a retrieve button 301 (refer to FIGS. 11 and 12) has been operated. When a negative determination is made (step S35: NO), the CPU of the PC 13 returns to step S33. When an affirmative determination is made (step S35: YES), the CPU proceeds to step S36. A case in which a negative determination is given in step S35 and an affirmative determination is given in step S35 is when the PC 13 requests the camera 12 to send all of the independent images corresponding to every one of the thumbnails shown on the display 15 and transmitted to the PC 13 from the camera 12.

In step S36, the CPU of the PC 13 transfers the data of the present list to the MPU 27 of the camera 12. Then, the CPU ends the specification data generation routine.

Figure 9:
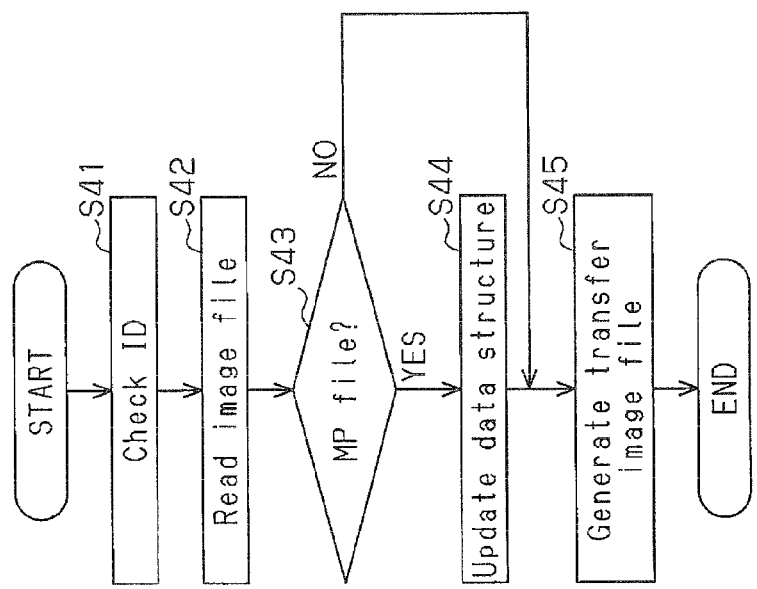
FIG. 9 is a flowchart of a routine for generating an image file.

Next, the specific contents of step S14 (transfer image file generation step) will be described in accordance with the transfer image file generation routine shown in FIG. 9. In the illustrated example, the camera 12 executes step S13.

First, in the transfer image file generation routine, in step S41, the MPU 27 of the camera 12 checks the ID information of the image files corresponding to the list 400 transferred from the CPU of the PC 13. Then, in step S42, the MPU 27 reads the image files, which are specified by the ID information, from the memory card 33 and temporarily stores the image files in the RAM 30. Step S41 corresponds to a receiving step in which the MPU 27 (reception unit) of the camera 12 (image data processor) receives designation information of the image data subject to transfer (i.e., data of the list 400) from the CPU of the PC 13, which serves as an external device.

In step S43, the MPU 27 determines whether or not the image files stored in the RAM 30 includes an MP file 70. When an affirmative determination is given (step S43: YES), the MPU 27 updates the data structure of the MP file 70 based on the contents of the list 400. More specifically, the MPU 27 updates the data structure of the MP file 70 by deleting image data that is related with an image corresponding to an image number marked by a cross and its thumbnail or the like from the MP file 70. After the updating, the MPU 27 proceeds to step S45. When a negative determination is given in step S43 (step S43: NO), the MPU 27 proceeds to step S45.

In step S45, the MPU 27 generates a transfer image file having a decreased data volume and corresponding to the updated MP file 70. Then, the MPU 27 ends the transfer image file generation routine.

The operation of the image data processing system 11 of the first embodiment will now be described. In particular, the operation for transferring image data and the like between the camera 12 and the PC 13 will be described below.

The following describes a case in which the data of the image files scheduled to be transferred from the memory card 33 of the camera 12 are the four SP files 40, 50, 60, and 80 and the single MP file 70, which are recorded in the DCF directory 37 of "100ABCDE", which is shown in FIG. 3. The MP file 70 stores the image data of twenty independent images related with each other. More specifically, the first independent image 701 from which the MP file 70 begins serves as a main image. The image data of nineteen images, which are the second independent image 702 to the twentieth independent image, are related and stored together with the image data of the first independent image in the MP file 70. Dedicated data processing software corresponding to the MP format is installed in both of the camera 12 and the PC 13. The software is used to process the related image data that is stored in an MP file in accordance with the MP format.

In this case, when the camera 12 and the PC 13 are connected by the USB cable 14 and become data-communicable manner, preparation for transferring the image data of each image file from the camera 12 to the PC 13 with the USB cable 14 is started.

First, the MPU 27 assigns an ID to each image file stored in the memory card 33. The ID is a temporary ID used by the PC 13, which is connected to the camera 12, to identify an image file that is recorded in the memory card 33. More specifically, the MPU 27 assigns an ID to each of the four SP files 40, 50, 60, and 80 and the MP file 70. For example, the IDs may be in an order of 0x0001, 0x0002, . . . , and so on. In the first embodiment, the ID assigned to the MP file 70 is 0x0005. Except for the ID assignment to the MP file 70, the ID assignment is known in the art and thus will not be described in detail. The MPU 27 transfers the ID of each image file to the PC 13. Based on the received ID, the PC 13 sequentially requests the thumbnail of each image file. When receiving a thumbnail request signal from the PC 13, the MPU 27 specifies the image file having the requested ID. Here, the MPU 27 determines the type (SP file or MP file) of the specified image file.

For example, when the extension of an image file is ".JPG", the MPU 27 determines that the image file is an SP file. When the extension of an image file is ".MPO", the MPU 27 determines that the image file is an MP file. For the SP type image files (in this case, the SP files 40, 50, 60, and 80), the display data of the SP thumbnails 41*a*, 51*a*, 61*a*, and 81*a* (refer to FIGS. 11 and 12), which are miniaturized images and have a smaller data volume than the independent images 41, 51, 61, and 81, are read from the corresponding headers 102 and temporarily stored in the RAM 30.

Figure 10:
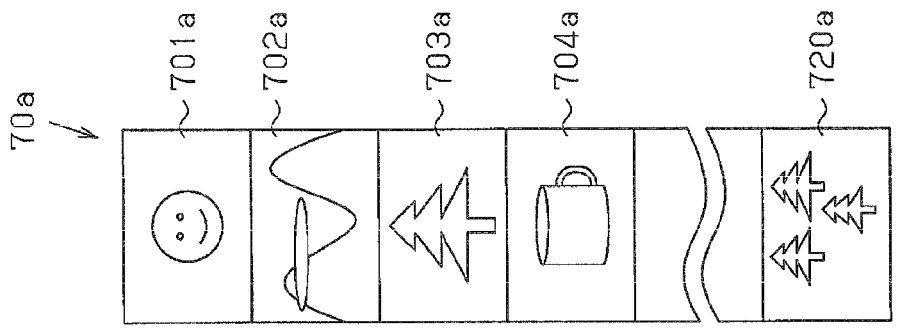
FIG. 10 is a schematic diagram of a combined thumbnail corresponding to a combined miniaturized image data.

When there is an MP type image file (in this case MP file 70), as shown in FIG. 10, the MPU 27 generates display data used to shown the combined thumbnail 70*a*. The display data of the combined thumbnail 70*a* is generated by combining a plurality of MP thumbnails 701*a* to 704*a* . . . 720*a* so that the monitor 20 of the camera 12 and the display 15 of the PC 13 show the combined thumbnail 70*a* including the MP thumbnails 701*a* to 704*a* . . . 720*a*. This display data is also referred to as combined miniaturized image data. The display data is temporarily stored in the RAM 30. The MPU 27 functions as a combined miniaturized image data generation unit that performs a combined miniaturized image data generation step.

The process for generating the combined thumbnail 70*a* will now be described. When the MPU 27 determines that the type of the MP file 70 is an MP file, the MPU 27 copies the MP file 70 in the RAM 30 (or the memory card 33). Then, the MPU 27 specifies each image in the copied MP file 70 and deletes the image data of the image. In accordance with the deletion, the MPU 27 rewrites the contents of the header 202 for the image at the beginning of the data structure of the copied MP file 70. The rewritten copied MP file 70 is an image file that stores display data of the combined thumbnail 70*a*, which combines the MP thumbnails corresponding to the images, and the necessary tag information. The combined thumbnail 70*a* is a simple display item. Thus, in the first embodiment, the data structure of the combined thumbnail 70*a* in the rewritten copied MP file 70 has a tag standardized by the MP format and including the minimum information of numbers for the independent images.

Then, the MPU 27 transfers, from the camera 12 to the PC 13 with the USB cable 14, display data for showing the SP thumbnails 41*a* (51*a*, 61*a*, 81*a*) temporarily stored in the RAM 30 of the camera 12 or display data for showing the single combined thumbnail 70*a*.

In this process, as described above, the thumbnail of each image file is independently transmitted from the camera 12 to the PC 13. More specifically, when the CPU of the PC 13 receives the ID information of an image file in the camera 12, the CPU requests the thumbnail of the image file (e.g., SP file 40) for ID0x0001. When the MPU 27 recognizes receipt of the request signal, the MPU 27 transfers the display data of the SP thumbnail 41*a* to the PC 13. When the CPU of the PC 13 receives the display data of the SP thumbnail 41*a*, the CPU shows the SP thumbnail 41*a* on the display. Further, the CPU transmits a request signal for the next thumbnail, namely, the thumbnail of the image file of ID0x0002.

When the MPU 27 of the camera 12 recognizes receipt of the request signal for the thumbnail of the image file of ID0x0005 (i.e., MP file 70), the MPU 27 transfers the display data of the display data (combined miniaturized image data) of the combined thumbnail 70*a* in the rewritten copied MP file 70 to the PC 13. In this manner, the MPU 27 and the CPU of the PC 13 repeats the process described above until completing the transfer of the thumbnail image data for the image file of each ID transmitted from the camera.

When the processing described above ends, as shown in FIG. 11, a list of the thumbnails corresponding to the display data transferred from the camera is shown on the display 15 of the PC 13. More specifically, an upper section of the display 15 shows the thumbnails 41*a*, 51*a*, and 61*a* respectively corresponding to the three SP files 40, 50, and 60 of which files names are "DSC_0001.JPG", "DSC_0002.JPG", and "DSC_0003.JPG" in order from the left side to the right side.

Further, a middle section of the display 15 shows the combined thumbnail 70*a* for the single rewritten and copied MP file 70 of which file name is "DSC_0004.MPO" extending in a single line from the left side to the right side. More specifically, the MP thumbnail 701*a* corresponding to the first independent image 701, which is the image that begins the file, is arranged at the left end of the display 15. The right side of the MP thumbnail 701*a* shows the remaining MP thumbnails 702*a*, 703*a*, 704*a*, and 705*a* respectively corresponding to the other relevant images from the second independent image 702.

Additionally, a lower section of the display 15 shows SP thumbnail 81*a* for the single SP file 80 of which file name is "DSC_0005.JPG" at the left side. When the list of thumbnails is shown on the display 15 in this manner, the CPU of the PC 13 generates the transfer subject specification list 400 such as that shown in FIG. 13.

Referring to FIG. 13, the transfer subject specification list 400 includes a file name column 401, an image number column 402, and a deletion indication column 403. The file name column 401 shows the file names of the image files corresponding to the thumbnails listed on the display 15 (i.e., the SP files 40, 50, 60, and 80 and the MP file 70). When the image file is the MP file 70, the image number column 402 shows the image numbers of the MP thumbnails (701*a* to 704*a* . . . 720*a*) respectively corresponding to the image data (203, 207, 211, 215, . . . ) contained in the MP file 70. When the image file is an SP file, the image number column does not show an image number. In the deletion indication column 403, a cross is marked when deletion from the transfer subject is selected.

Referring to FIG. 11, the SP thumbnail 41*a*, which is shown on the display 15 at the left end of the upper section, is desired as the subject of transfer from the camera 12 to the PC 13. In this case, the SP thumbnail 41a is selected with a tetragonal and blinking framed cursor 300. The framed cursor 300 is moved by using a mouse or keyboard 17 of the PC 13.

The retrieve button 301 and the delete button 302 are shown on the display 15 below the lower section that shows SP thumbnail 81a. The user operates the mouse to move an arrow-shaped pointer 303 on the display 15 (refer to FIG. 12) and operates the button 301 or 302 by performing an external operation such as a left click of the mouse 16.

More specifically, when the delete button 302 is operated, the image data of the independent image (41, 51, . . . ) corresponding to the thumbnails 41a, 51a, 61a, and 701a to 705a selected by the framed cursor 300 is removed from the transfer subject of the image data. For example, FIG. 12 shows the display 15 in a state immediately after the delete button 302 is operated in which the thumbnail 704a that is fourth from the left in the combined thumbnail 70a is selected with the framed cursor 300.

When the delete button 302 is operated with the framed cursor 300 arranged on a thumbnail, as shown in FIG. 12, the thumbnail is, for example, shaded so that it can be distinguished from the other thumbnails. In FIG. 12, the thumbnail 702a that is second from the left is also shaded. This indicates that deletion of the thumbnail 702a was selected before selection of the fourth MP thumbnail 704a. In the first embodiment, the framed cursor 300 is further moved toward the right from the state shown in FIG. 12 to shade every MP thumbnail having an even image number. Whenever an MP thumbnail of an even image number is selected, the delete button 302 is operated. This shades every MP thumbnail having an even image number.

In this manner, when the delete button 302 on the display 15 is operated thereby shading a thumbnail other than that corresponding to an independent image of which the image data is desired as the transfer subject, the CPU of the PC 13 updates the transfer subject specification list 400, as shown in FIG. 13. In the first embodiment, a cross is marked for each image file (for an MP file, the image number corresponding to an MP thumbnail) corresponding to a thumbnail that is shaded on the display 15. The cross indicates that the corresponding independent image is to be removed from the transfer subject.

The specification of thumbnails that shades thumbnails on the display 15 generates transfer subject specification data that allows for specification of the image data subject to transfer from the image data (103, 203, 207, 211, 215, . . . ) contained in the SP files (40, 50, 60, and 80) and the MP file 70. The CPU of the PC 13 functions as a specification data generation unit that executes the specification data generation step (step S13).

In the example shown in FIG. 13, crosses are marked in the deletion indication column 403 for the second MP thumbnail 702a, the fourth MP thumbnail 704a, and the other even image number MP thumbnails in correspondence with the shaded thumbnails in the display 15 of FIG. 12. Accordingly, in the first embodiment, the image data (207, 215, . . . ) of the nineteen MP independent images (702, 704, . . . ) corresponding to the MP thumbnails having even image numbers are removed from the transfer subject. In other words, the image data (203, 211, . . . ) of the ten odd number MP independent images (701, 703, . . . ) are specified as the transfer subject. The ten even number MP independent images (702, 704, . . . ) are not specified as the transfer subject.

In this stage, when the retrieve button 301 on the display 15 is operated, the display data of the presently generated (or updated) transfer subject specification list 400 is transferred as transfer subject specification data from the CPU of the PC 13 to the MPU 27 of the camera 12 by the USB cable 14.

Then, the MPU 27 of the camera 12 generates a transfer image file, which is an image file containing the image data of each independent image having a file name (image number for MP files) that is not marked by a cross in the deletion indication column 403 of the transfer subject specification list 400. In this case, as shown in FIG. 14, a transfer image file 170 is generated for an MP file. The transfer image file 170 contains the image data (203, 211, . . . ) of the ten odd number MP independent images (701, 703, . . . ) corresponding to the MP thumbnails having image numbers that are not marked by a cross in the deletion indication column 403. That is, based on the transfer subject specification list 400, the MPU 27 executes a transfer image file generation step for generating a transfer image file that contains the image data of the transfer subject. The MPU 27 functions as a transfer image file generation unit that executes the transfer image file generation step.

In the original MP file 70, the data for twenty images that are related to one another is recorded in the same file. However, in the transfer image file 170, the even number MP independent images are removed. This decrease the data to one half, that is, ten images (even number) subtracted from twenty images equal ten images (odd number). Thus, the transfer image file 170, which is an MP file having an accordingly decreased data volume, is transferred from the MPU 27 of the camera 12 to the CPU of the PC 13 by the USB cable 14. In this manner, the MPU 27 executes a transferring step for transferring the transfer image file 170 from the camera 12 to the PC 13. Further, the MPU 27 functions as a transfer image file generation unit that executes the transfer image file generation step.

In this manner, in the first embodiment, when the image data (203, 207, 211, 215, . . . ) of the MP file 70 is transferred from the camera 12 to the PC 13, deletion of the MP thumbnails (701a to 704a . . . 720a) on the display 15 of the PC 13 specifies the image data of the images that are desired as the transfer subject. By containing only image data specified in this manner, the transfer image file 170 transferred to the PC 13 is a new MP file having a smaller data volume and storing less image data than the original MP file 70.

The decrease in the data volume of the file reduces the load for transferring the file from the camera 12 to the PC 13 with the USB cable 14. The image data contained in the MP file 70 is not transferred over a plural number of times for each image. Rather, a data output step is executed so that the display data of the combined thumbnail 70a, which allows for the MP thumbnails corresponding to the images to be successively shown, is executed just once. This shortens the transfer time. Image data that does not need to be transferred is removed to generate the transfer image file 170, and the final image data contained in and transferred by the transfer image file 170 is only the image data that is required to be transferred. Thus, unnecessary image data is not transferred.

The first embodiment has the advantages described below.

(1) When the image file that is to be transferred by the camera 12 to the PC 13 is the MP file 70, unnecessary image data is removed to decrease the amount and volume of the transferred data. That is, the MPU 27 of the camera 12 (and the CPU of the PC 13) executes the combined miniaturized image data output step, the specification data generation step, and the transfer image file generation step before executing the transferring step. This decreases the data volume of the final image file transferred from the camera 12 to the PC 13. Thus, the transfer load is reduced, and the data processing efficiency is improved. Further, there is no need for the PC 13 to generate an MP file based on the transferred image data.

(2) In the specification data generation step S13, the single combined thumbnail 70a, which combines the MP thumbnails (701a to 704a . . . 720a) and is transferred from the camera 12 to the PC 13, is used to determine and specify the image data of the transfer subject. Thus, in comparison to when a plurality of thumbnails corresponding to a plurality of independent images are transferred one at a time, the PC 13 executes less thumbnail request steps. Further, there is no need for the PC 13 to generate an MP file for the separated thumbnails.

(3) The transfer image file 170, which is a new MP file ultimately transferred from the camera 12 to the PC 13, has a data structure containing only the image data desired as the transfer subject and does not contain image data that does not need to be transferred. Thus, time for transferring unnecessary image data is not consumed. This improves the data processing efficiency.

(4) When specifying a transfer subject from a plurality of MP independent images (701 to 704 . . . ), the MP thumbnails (701a to 704a . . . 720a) corresponding to the MP independent images (701 to 704a . . . ), which are the selection candidates of the transfer subject, are shown on the display 15 of the PC 13, which is larger than the monitor 20 of the camera 12. This facilitates the task for selecting MP thumbnails used to specify the image data of the transfer subject and improves the data processing efficiency.

(5) The connection of the MPU 27 of the camera 12 and the CPU of the PC 13 with the USB cable 14, which serves as a connection unit, triggers initiation of each step for transferring image data. This facilitates operability and improves the data processing efficiency.

(6) Information that is required to comply with the communication standard is added to the display data for each SP thumbnail and combined thumbnail transmitted from the camera 12 to the PC 13. However, in the case of display data for a combined thumbnail, such information only needs to be added once to the combined thumbnail and does not have to be added to each of the MP thumbnails in the combined thumbnail. Thus, in comparison with when the thumbnail of each independent image in the MP file is transmitted, the information added in compliance with the communication standard is decreased. This accordingly decreases the amount of transmitted data.

Second Embodiment

A second embodiment of the present invention will now be discussed with reference to FIG. 15. The second embodiment differs from the first embodiment only in the data output routine. Accordingly, the differences from the first embodiment will mainly be described below. Like or same reference numerals are given to those components that are the same as the corresponding components of the first embodiment. Such components will not be described.

Figure 15:
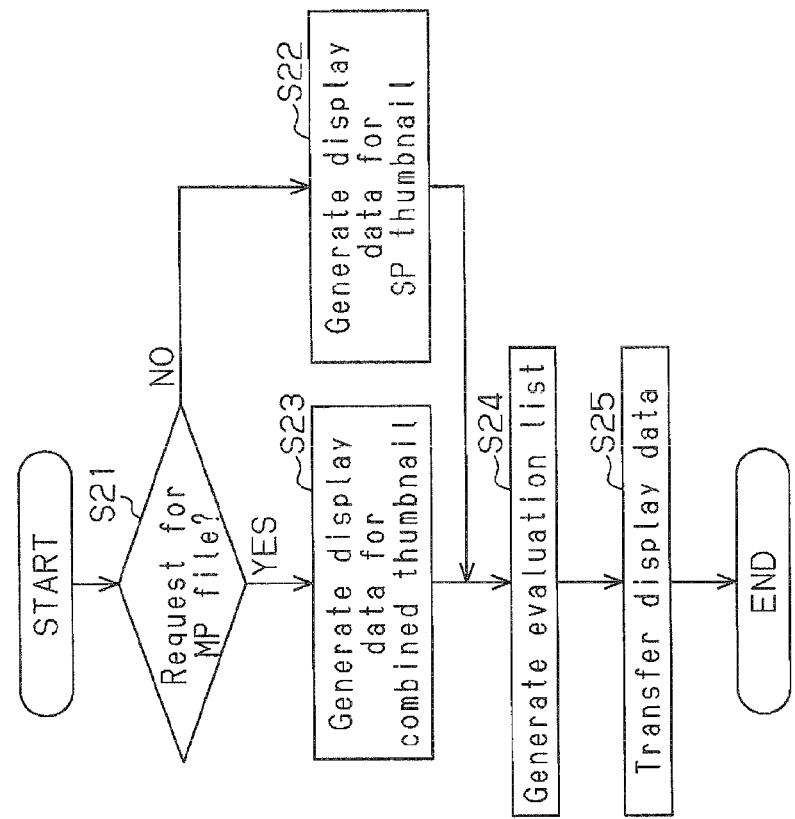
FIG. 15 is a flowchart of a routine for outputting data in a second embodiment.

Referring to FIG. 15, in the data output routine of the present embodiment, first, in step S20, the MPU 27 determines whether or not this is the first time a request for transfer of a thumbnail for the image data of an image file has been received and that such a transfer request was not received in the past. When an affirmative determination is made (step S21: YES), the MPU 27 performs processes that are the same as steps S21 to S23 in the data output routine of the first embodiment shown in FIG. 7. Then, the MPU 27 proceeds to step S24.

In step S24, the MPU 27 stores in the RAM 30 (or the memory card 33), which serves as a memory, the display data of the thumbnail (SP thumbnail 41a and the like or the combined thumbnail 70a) that has been generated in step S22 or S23. Then, the MPU 27 proceeds to step S25. When a negative determination is made in step S20 (step S20: NO), the MPU 27 skips steps S21 to S24 and proceeds to step S25.

In step S25, the MPU 27 reads, from the RAM 30, the display data of the thumbnail (SP thumbnail 41a and the like or the combined thumbnail 70a) corresponding to the image data of which transfer is requested. Then, the MPU 27 transfers the read thumbnail display data to the CPU of the PC 13 and ends the data output routine.

In the second embodiment, once the camera 12 generates and transfers thumbnail display data in response to a transfer request for the image data of an image file (e.g., MP file 70), the MPU 27 does not generate the same thumbnail display data again even when the same image data is requested to be transferred (second transfer request). In this manner, when such a second transfer request is received from the same PC 13 that issued the first transfer request or when the same request is coincidentally received from another PC, the thumbnail display data stored in the RAM 30, which serves as a memory, is readily transferred to the PC that originated the request.

Accordingly, in addition to advantages (1) to (6) of the first embodiment, the second embodiment has the next advantage.

(7) When thumbnail display data has been generated and stored in the RAM 30 and a transfer request for the corresponding image data is received again, the same thumbnail display data is not generated again. The thumbnail display data that has already been previously generated is read from the RAM 30 and transferred to the PC. This reduces the transfer load on the camera 12. Further, the time is shortened from when a transfer request for image data is received to when the thumbnail display data corresponding to the image data is transferred. This improves the transferring efficiency.

Third Embodiment

A third embodiment of the present invention will now be discussed with reference to FIGS. 16 to 18. The third embodiment differs from the first embodiment only in the data output routine. Accordingly, the differences from the first embodiment will mainly be described below. Like or same reference numerals are given to those components that are the same as the corresponding components of the first embodiment. Such components will not be described.

Figure 7:
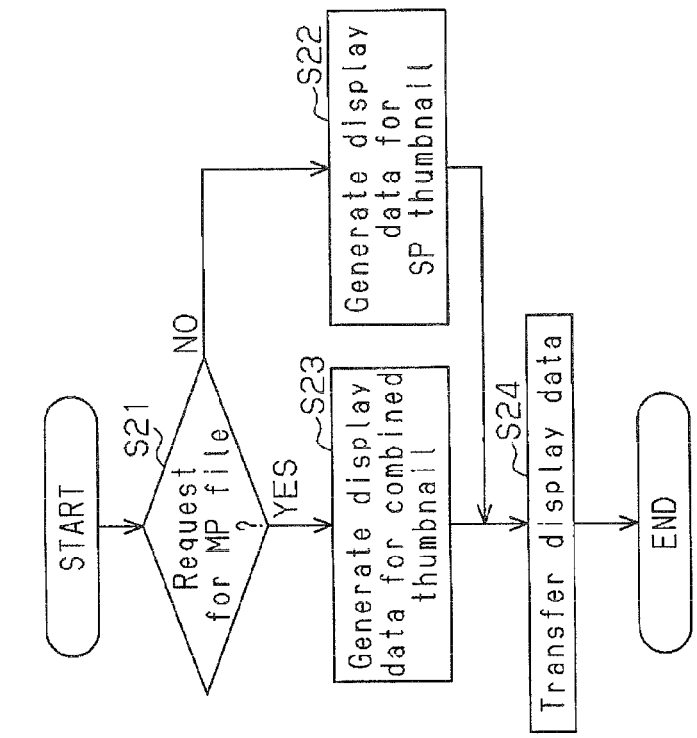
FIG. 7 is a flowchart of a routine for outputting data.
Figure 16:
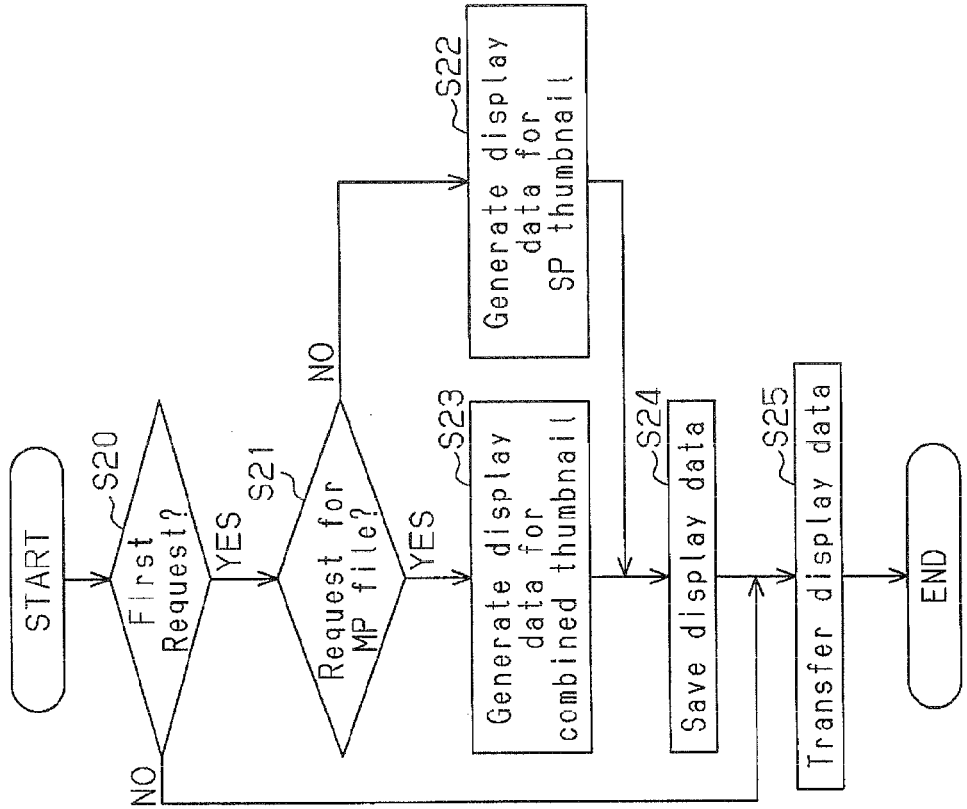
FIG. 16 is a flowchart of a routine for outputting data in a third embodiment.

Referring to FIG. 16, in the data output routine of the present embodiment, first, in step S20, the MPU 27 performs processes that are the same as steps S21 to S23 in the data output routine of the first embodiment shown in FIG. 7. Then, the MPU 27 proceeds to step S24. In step S24, the MPU 27 generates an evaluation list 500 and stores the various information contained in the evaluation list 500 in the RAM 30.

Figures 17, 18:
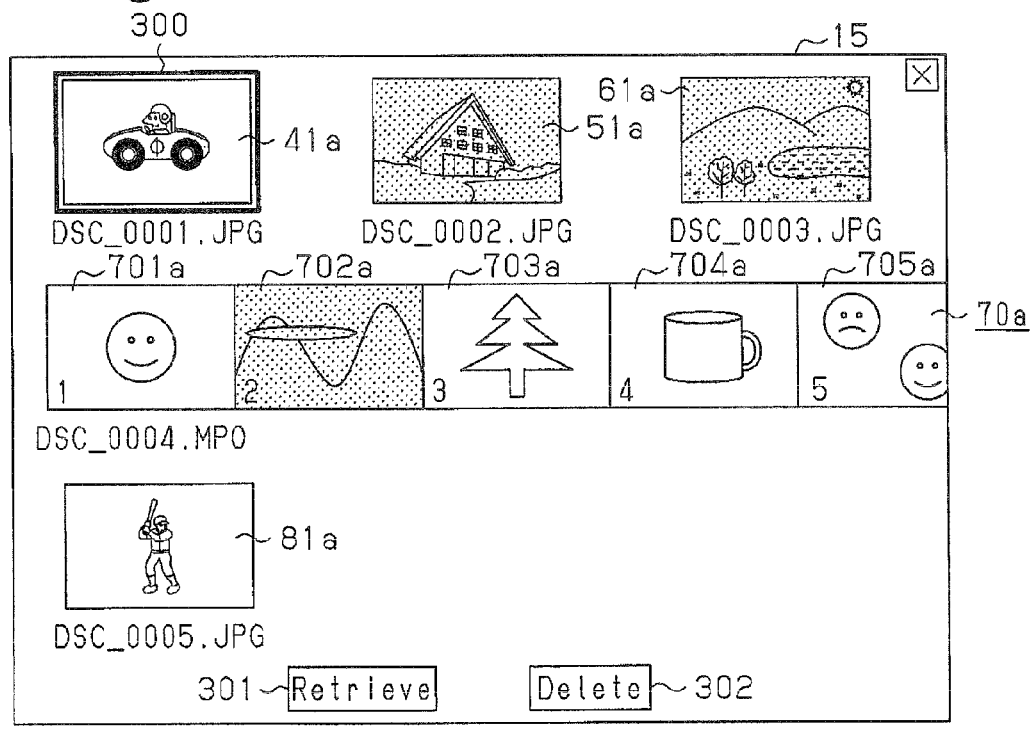
FIG. 17 is an evaluation list showing image evaluation information.
FIG. 18 is a diagram showing an initial screen on a PC display in a transfer subject specification data generation step.

As shown in FIG. 17, the evaluation list 500 includes a file name column 501, an image number column 502, and an image evaluation column 503. The file name column 501 shows the file names of the image files (the SP files 40, 50, 60, and 80 and the MP file 70) corresponding to the thumbnails (SP thumbnail 41a and the like and the combined thumbnail 70a) generated in step S22 or S23. When the image file is the MP file 70, the image number column 502 shows the image numbers of the MP thumbnails (701a to 704a . . . 720a) respectively corresponding to the image data (203, 207, 211, 215, ...) contained in the MP file 70. When the image file is an SP file, the image number column does not show an image number.

The image evaluation column 503 shows image evaluation information of the images (independent images) corresponding to the thumbnails (SP thumbnail 41a and the like or the combined thumbnail 70a) generated in step S22 or S23. More specifically, the image evaluation information uses a circle or a cross to indicate the evaluation of each image. For example, each image is evaluated for blurring or defocusing when captured during continuous shooting. Additionally, each image may be evaluated for satisfactory exposure. The MPU 27 of the camera 12 obtains the image evaluation information by analyzing the meta data or the like of each image in the image file. In the present embodiment, the image evaluation information for each image written to the image evaluation column 503 is recorded by the MPU 27 as header information for the corresponding thumbnail (SP thumbnail 41a and the like or combined thumbnail 70a).

In step S25, the MPU 27 reads, from the RAM 30, the display data of the thumbnail (SP thumbnail 41a and the like or the combined thumbnail 70a) corresponding to the image data of which transfer is requested. Then, the MPU 27 transfers the read thumbnail display data to the CPU of the PC 13 and ends the data output routine.

In the third embodiment, when a transfer request for thumbnails is received from the PC 13 and the camera 12 transfers the display data of each thumbnail in response to the request, as shown in FIG. 18, a list of the thumbnails corresponding to the display data transferred from the camera 12 is shown on the display 15 of the PC 13.

Among the thumbnails in the list shown on the display 15, the thumbnails of the images marked by crosses in the evaluation list 500 of FIG. 17 are shaded on the display 15 and distinguished from the other thumbnails. This provides the user with image evaluation information indicating that the image quality is poor for the image (independent image) corresponding to the shaded thumbnails (in this case, the SP thumbnails 51a and 61a and the MP thumbnail 702a).

In this manner, thumbnails corresponding to images having a poor image evaluation due to image quality or the like should be deleted from the transfer subject. The camera 12 has an image evaluation function that uses a cross to indicate the evaluation of such an image. In this case, the PC 13 shows the corresponding thumbnail in a shaded state in the same manner as if the delete button 302 were operated in the first place. This allows for a decrease in the number of times the delete button 302 of the PC 13 is operated during generation of the transfer subject specification data compared to when the delete button 302 is operated to delete thumbnails that do not have to be transferred.

Accordingly, in addition to advantages (1) to (6) of the first embodiment, the third embodiment has the next advantage.

(8) In the above embodiments, when generating the transfer subject specification data, the framed cursor 300 is arranged on the thumbnail corresponding to the image that is to be deleted from the transfer subject and the delete button 302 of the PC 13 is then operated. However, the third embodiment decreases the number of times the delete button 302 is operated to delete thumbnails. This reduces the working load in the specific data generation step.

Fourth Embodiment

Figure 19:
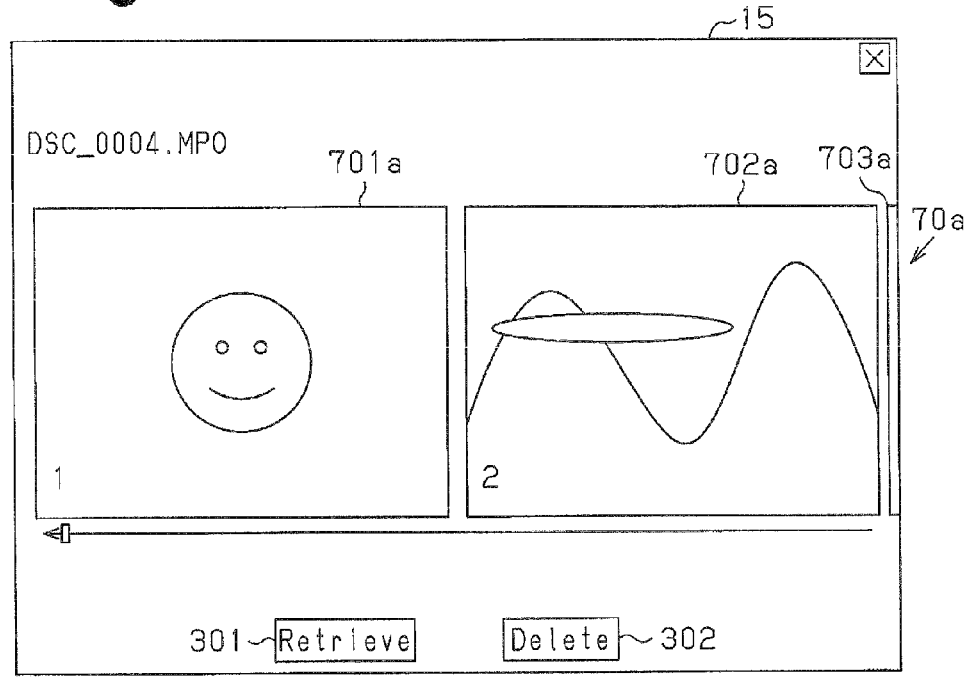
FIG. 19 is a diagram showing a combined thumbnail on a portable terminal of a comparison example.
Figure 20:
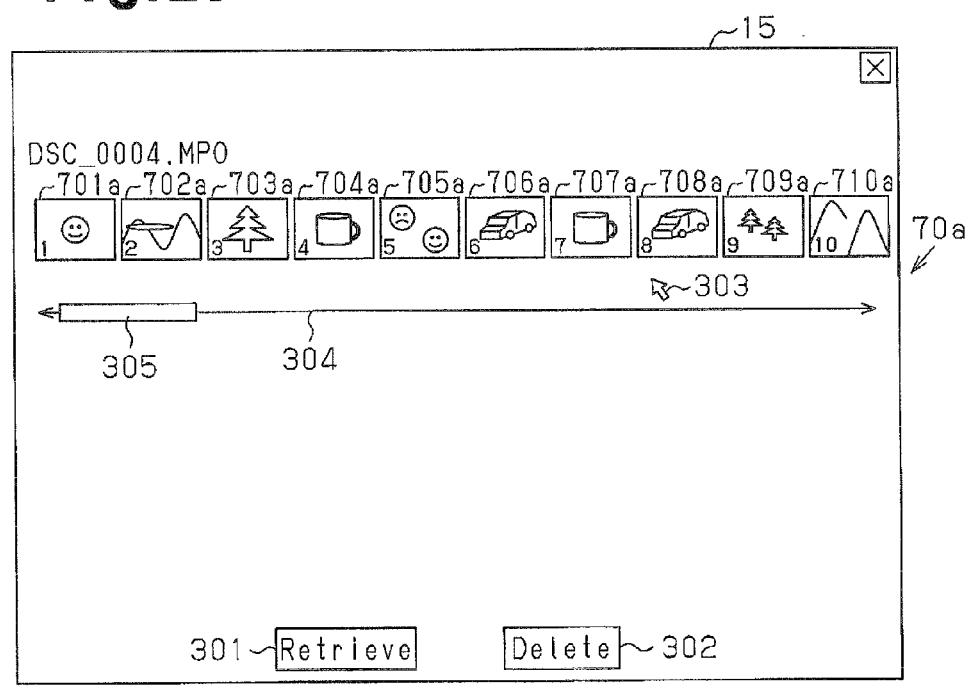
FIG. 20 is a diagram showing a combined thumbnail on a portable terminal in a fourth embodiment.

A fourth embodiment of the present invention will now be discussed with reference to FIGS. 19 and 20. The fourth embodiment differs from the first embodiment in that the PC 13 is replaced by a portable terminal such as a smart phone or the like having a relatively small screen. The differences from the first embodiment will mainly be described below.

The portable terminal, which serves as a second device, transfers a request signal to the camera 12, which serves as a first device, to request for the transfer of image data for thumbnails. The request signal includes ID information for specifying image files and size information of a display 15 of the portable terminal originating the request.

For example, the display 15 of the portable terminal has a screen size of 640 pixels by 480 pixels. In contrast, the image size of a typical thumbnail (miniaturized image) is 320 pixels by 240 pixels. Thus, as shown in FIG. 19, a maximum of only two thumbnails (MP thumbnail 701a and MP thumbnail 702a) can be shown at the same time on the display 15 of the portable terminal.

As one example, a case in which there is a request for the transfer of image data from an image file that stores fifty images and the corresponding thumbnails will now be discussed. In this case, only two thumbnails can be shown at the same time on the display 15. Thus, an operation for scrolling the display 15 must be performed 25 times (50/2). This leads to complicated processing of the specific data generation step in the portable terminal. To solve this problem, in the fourth embodiment, when the display data of the combined thumbnail 70a is output (transmitted) to the portable terminal in the data output step S12 of the camera 12, the display size of the thumbnails is adjusted as described below.

The MPU 27 of the camera 12 calculates the number of scrolls required for the portable terminal based on the display size information (number of pixels from side to side and from top to bottom) of the display 15 transmitted from the portable terminal and the quantity of MP thumbnails (701a, ...) of the combined thumbnail 70a output in the data output step S12. When the calculation result of the required number of scrolls exceeds a predetermined threshold (e.g., five), the image size of the MP thumbnails (701a, ...) in the combined thumbnail 70a in the output display data is adjusted so that the required number of scrolls becomes less than or equal to the threshold.

For example, when the calculation result indicates that the required number of scrolls is 25 (50/2), the image size of each MP thumbnail (701a, ...) in the combined thumbnail 70a shown on the display 15 of the portable terminal is adjusted to one fifth of the normal size. As a result, ten MP thumbnails 701a to 710a are shown at the same time arranged next to each other in a row as in FIG. 20. From the state shown in FIG. 20, to view all fifty MP thumbnails (701a, ...), a movement marker 305 is moved along a scroll bar 304. That is, scrolling is performed for a total of five times (50/10) with the movement marker 305.

Accordingly, in addition to advantages (1) to (6) of the first embodiment, the fourth embodiment has the next advantage.

(9) The transferred display data is for thumbnails having a size that is suitable for the display 15 (screen) of the portable terminal (second device), which is the transfer destination of the image data. Thus, the number of times the combined thumbnail 70a has to be scrolled on the portable device is decreased. This reduces the working load in the specific data generation step.

Fifth Embodiment

Figure 21:
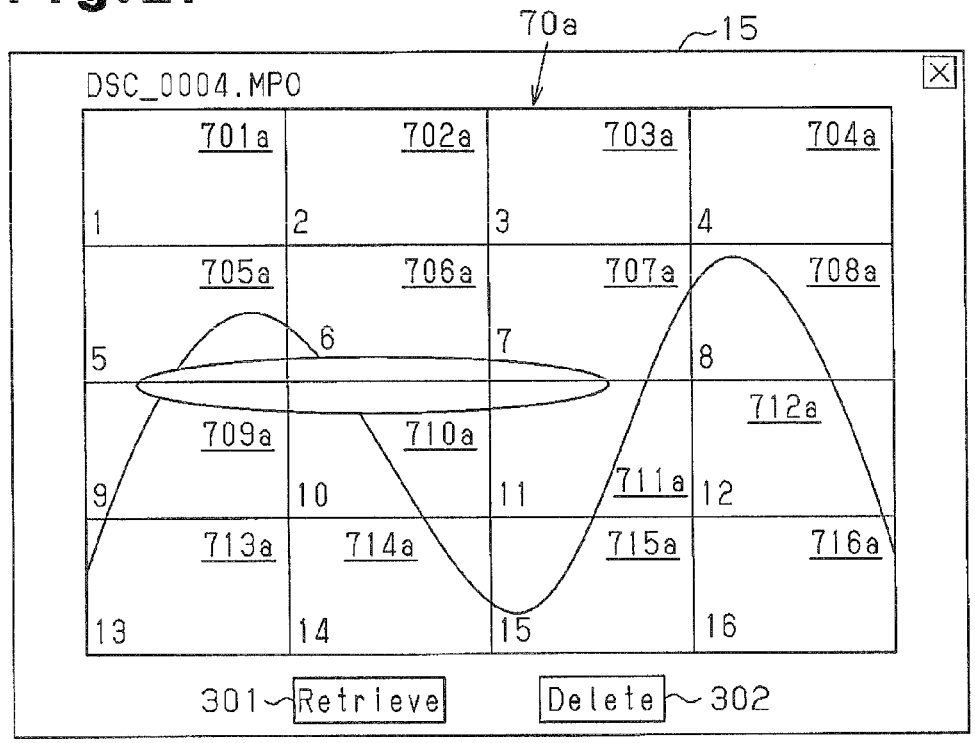
FIG. 21 is a diagram showing a combined thumbnail for a panoramic image in a fifth embodiment.

A fifth embodiment of the present invention will now be discussed with reference to FIG. 21. In the first embodiment, the MP thumbnails (701a, ...) of the combined thumbnail 70a is arranged next to each other in a row for images generated during continuous shooting, for example. The fifth embodiment differs from the first embodiment in that images obtained through panoramic shooting are joined at their edges with one another from side to side and from top to bottom. Otherwise, the fifth embodiment is the same as the first embodiment. Accordingly, the differences from the first embodiment will mainly be described below. Such components will not be described.

In the fifth embodiment, when the user requests the transfer of image data for thumbnails from the PC 13 to the camera 12, a request signal is generated. The request signal includes ID information for specifying image files and size information of the display 15 of the PC 13 originating the request.

A panoramic image is formed by joining adjacent images at their edges with one another from side to side and from top to bottom. Thus, depending on the shape and size of the display 15, the shape and size of the combined thumbnail 70*a*, which is a panoramic image, and the dimensional ratio of the display 15 and combined thumbnail 70*a*, the display 15 may include unused space.

The information related to the shooting type recorded to the header of the MP file is referred to when determining whether an MP file is obtained through panoramic shooting. A panoramic image layout tag and an overlapping region tag are recorded in the header. The panoramic image layout tag and overlapping region tag form the information required to generate a panoramic image based on the image data for a plurality of images in the MP file. When the images in the MP file are obtained through panoramic shooting, information indicating that the images are for a panoramic image is transmitted together with the panoramic image layout tag and the overlapping region tag. To show the combined thumbnail 70*a* as a panoramic image, the panoramic image layout tag and the overlapping region tag are recorded to the header when generating the display data for the combined thumbnail 70*a* in the camera 12.

As one example, a case in which the combined thumbnail 70*a* of a panoramic image output from the camera has a size of 3000 pixels by 2000 pixels will now be discussed. In this case, a total of sixteen MP thumbnails 701*a* to 716*a* are shown, four from side to side and four from top to bottom. The MP thumbnails 701*a* to 716*a* each have a size of 750 pixels by 500 pixels. The display 15 of the PC 13 has a size of, for example, 1980 pixels by 1024 pixels.

In this case, it is preferred that the sixteen MP thumbnails 701*a* to 716*a* of the combined thumbnail 70*a* of the panoramic view be shown using the entire screen of the display 15. In the fifth embodiment, when the camera 12 outputs (transmits) the display data of the combined thumbnail 70*a* in the data output step S12 to the PC 13, the size of the thumbnails is adjusted as described below.

The MPU 27 of the camera 12 calculates the image size of each MP thumbnail (710*a*) based on the display size information (number of pixels from side to side and from top to bottom) of the display 15 transmitted from the PC 13 and the size of the combined thumbnail 70*a* for the panoramic view output in the data output step S12. More specifically, the image size of each MP thumbnail (701*a*, . . . ) in the combined thumbnail 70*a* of the output display data is adjusted so that the combined thumbnail 70*a* of the panoramic image is shown using the entire screen of the display 15.

For example, when showing the combined thumbnail 70*a* of a panoramic image having a size of 3000 pixels by 2000 pixels on the display 15 of the PC 13 having a size of 1980 pixels by 1024 pixels, the combined thumbnail 70*a* is adjusted so that its entire size is within 1536 pixels by 1024 pixels or smaller. In other words, the image size of each MP thumbnail (701*a*) is adjusted to be within 384 pixels by 256 pixels, which is larger than a normal thumbnail having an image size of 320 pixels by 240 pixels. As a result, although a slight space is left in the lateral direction, the combined thumbnail 70*a* of the panoramic image uses the entire screen of the display 15 from top to bottom.

Accordingly, in addition to advantages (1) to (6) of the first embodiment, the fifth embodiment has the advantages described below.

(10) When the image data is for a panoramic image, the transferred display data is for thumbnails having an image size that is suitable for the screen size of the display 15 (second device), which is the transfer destination of the image data. This shows the combined thumbnail 70*a* for the panoramic view on the PC 13 on the entire screen without producing unused space.

Sixth Embodiment

A sixth embodiment of the present invention will now be discussed with reference to FIGS. 20 and 22. In the sixth embodiment, a function for magnifying the combined thumbnail 70*a* on the display 15 is added to the portable terminal (second device) of the fourth embodiment. Accordingly, the additions made to the fourth embodiment will mainly be described below. Other components that are the same as the fourth embodiment will not be described.

Like the fourth embodiment, in the sixth embodiment, when the user requests the transfer of image data for thumbnails from the portable terminal to the camera 12, a request signal is generated. The request signal includes ID information for specifying image files and size information of the display 15 of the portable device originating the request.

In accordance with the size of the display 15 (screen) of the portable terminal (second device), which is the transfer destination of the image data, the camera 12 adjusts the image size of the MP thumbnails (701*a*, . . . ) in the combined thumbnail 70*a* so that they are smaller than normal. As a result, as shown in FIG. 20, a large number of (e.g., ten) the MP thumbnails 701*a* to 710*a* are arranged next to each other in a row at the same time.

The image size of the MP thumbnails (701*a*, . . . ) may be reduced so that the required number of scrolls becomes less than or equal to a threshold. However, in such a case, when the combined thumbnail 70*a* includes a large number of MP thumbnails (701*a*, . . . ), the size of each MP thumbnail (701*a*, . . . ) becomes extremely small. Thus, the details of the image may be difficult to view. To cope with this problem, in the sixth embodiment, when showing the MP thumbnails (701*a*, . . . ) on the display 15 based on the display data for the combined thumbnail 70*a* output (transmitted) from the camera 12 and adjusted to have a small size, the thumbnail display size is adjusted as described below.

Figure 22:
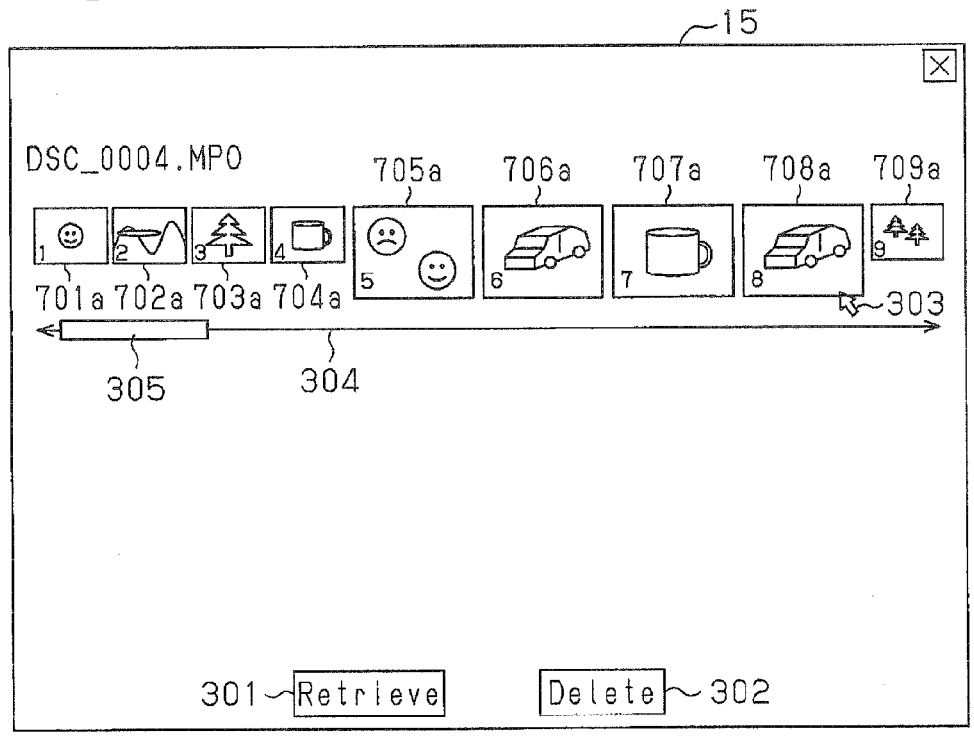
FIG. 22 is a diagram of a combined thumbnail on a portable terminal in a sixth embodiment.

Referring to FIG. 22, the pointer 303 is arranged on an MP thumbnail to select the MP thumbnail be performing a clicking operation. This magnifies the selected MP thumbnail. In FIG. 22, the fifth to eighth MP thumbnails 705*a* to 708*a* are selected and magnified to be larger than the other thumbnails.

Accordingly, in addition to advantages (1) to (6) of the first embodiment and advantage (9) of the fourth embodiment, the sixth embodiment has the advantages described below.

(11) The working load in the specific data generation step is reduced by decreasing the number of times the combined thumbnail 70*a* has to be scrolled on the portable device. At the same time, when it is desired that the image contents of an MP thumbnail be checked, the MP thumbnail is magnified. This allows for the details of the image content to be easily checked.

It should be apparent to those skilled in the art that the present invention may be embodied in many other specific forms without departing from the spirit or scope of the invention. Particularly, it should be understood that the present invention may be embodied in the following forms.

In the embodiments described above, the second device, which is connected by the USB cable 14 to the camera 12 that serves as the first device, may be a high-definition TV, which has a larger screen than the display 15. In such a case, the MPU 27 of the camera 12 functions as a controller that executes the image data processing program.

In the first to third embodiments, the camera 12 (first device) and the PC 13 are connected to each other by the USB cable 14. However, the first and second devices may be connected to each other by other means. For example, the transfer of data between the first and second devices may be performed through wireless communication. Further, when either one or both of the devices does not have a wireless communication function, a device that enables wireless communication may be connected to at least one of the first and second devices to transfer data.

In the first to third embodiments, the camera 12 (first device) and the PC 13 are connected to each other by the USB cable 14. However, the first and second devices may be connected to each other by a High-Definition Multimedia Interface (HDMI) cable. An HDMI cable is a connection unit that enables bidirectional communication of video signals, audio signals, and control signals between the camera 12 and the PC 13. Thus, the processing of the image data for the images shown on the display 15 of the PC 13 may be performed by operating a selection button on the camera 12. This allows for the MPU 27 to function as a controller that executes every one of the data output step, the specification data generation step, the transfer image file generation step, and the transferring step. As a result, the freedom of design for the image data processing system 11 is increased. This indirectly improves the data processing efficiency. In this case, the selection button of the camera 12 functions as an external operation unit.

In the first to third embodiments, image files are read from the camera 12 when the camera 12 and the PC 13 are connected by the USB cable 14 in a data-communicable state. However, when the camera 12 and the PC 13 are in a data communicable state, image files may be read from the camera 12 when there is a command from the PC 13 to transfer data.

In step S24 of the second embodiment, the display data for the thumbnails (the SP thumbnail 41*a* or combined thumbnail 70*a*) generated by the MPU 27 is stored in the RAM 30 (or the memory card 33). In addition, the display data may be embedded and stored in a vender storage region of the original MP file.

In the second embodiment, the display data for the thumbnails (the SP thumbnail 41*a* or combined thumbnail 70*a*) may be stored in the RAM 30 (or the memory card 33 or the vender storage region of the original MP file) from the beginning regardless of whether or not there is a image data transfer request from the second device such as the PC 13.

In the third embodiment, the image evaluation information is recorded in the header information of each MP thumbnail (701*a*, . . . ). In addition, the list information of the evaluation list 500 may be output (transmitted) from the camera 12 to the PC 13 together with the display data of the combined thumbnail 70*a*. In this case, the PC 13 may execute a display control by analyzing the list information of the evaluation list 500.

In the fourth to sixth embodiments, the screen size of the PC 13 or portable terminal serving as the second device may differ from the illustrated examples.

In the fourth and sixth embodiments, the predetermined scrolling threshold is five. However, the threshold is not limited and may take any value as long as the MP thumbnails (701*a*, . . . ) of the combined thumbnail 70*a* may be viewed by performing scrolling for a small number of times. Nevertheless, it is desirable that the threshold be five or less such as four or three.

In the fifth embodiment, the number of MP thumbnails (70*a*, . . . ) in the combined thumbnail 70*a* that forms a panoramic image is four from side to side and four from top to bottom. However, the combined thumbnail 70*a* may include any number of MP thumbnails in accordance with the panoramic shooting conditions.

In the embodiments discussed above, the camera may assign IDs that indicate whether an image file is an MP file or an SP file. For example, a number starting with "1" may be used to indicate an SP file, such as 10001, 10002, . . . . A number starting with "2" may be used to indicate an MP file such as 20001. The assigned IDs are not limited to numbers and may be alphabetic characters or a combination of alphabetic characters and numbers.

In the embodiments discussed above, the combined thumbnail 70*a* and the SP thumbnails 41*a*, 51*a*, 61*a*, and 81*a*, which are used to determine and specify the image data of the transfer subject, may be shown on the monitor 20 of the camera 12.

In the embodiments discussed above, the series of processes ends when the transfer of image file thumbnails for every ID transmitted from the camera 12 is completed. Instead, the series of processes may end when the transfer of image file thumbnails for only some of the transmitted IDs is completed. More specifically, the user of the PC 13 may designate the IDs of the thumbnails that he or she wishes to be transferred so that only the thumbnails of the designated IDs are transferred.

In the embodiments discussed above, prior to the data output step, text information (not including image information) indicating the contents of the image data stored in the memory card 33 may be transferred from the camera 12 to the PC 13. In this case, the data output step may be executed when a transfer request is sent from the PC 13 to the camera 12.

In the embodiments discussed above, thumbnails are directly transferred from the camera 12 to the PC 13. However, in a state in which the PC 13 and camera 12 are connected, when the PC 13 generates a thumbnail request, the SP thumbnails 41*a*, 51*a*, 61*a*, and 81*a* and the combined thumbnails 70*a* in the camera 12 may be temporarily stored in the RAM 30 before being transferred to the PC 13.

In the embodiments discussed above, the MP thumbnails of the combined thumbnail 70*a* are continuously arranged from side to bottom but may be arranged from top to bottom instead. Further, the MP thumbnails may be shown in a superimposed state on the display 15 so that only the MP thumbnail for the first image can be viewed. By pointing the group of superimposed MP thumbnails with the pointer 303 and performing a clicking operation, the MP thumbnails are spread out sideward in a row like in the embodiments discussed above.

In the embodiments discussed above, the transfer image file 170 may be generated by rewriting and saving the original MP file with only the image data that is subject to transfer. However, the total number of captured images may be recorded to the original MP file 70. As a result, the rewriting may change the total number of captured images. This would not comply with the MP format standard. In such a case, a separate and new image file that is in compliance with the MP format recording rule must be generated.

In the embodiments discussed above, the MPU 27 generates the combined thumbnail 70*a* and transmits the combined thumbnail 70*a* to the PC 13 or portable terminal. However, the MPU 27 may read the thumbnail image data corresponding to each independent image (701 to 704 . . . ) from the MP file 70 without generating the combined thumbnail 70*a* and separately transmit the thumbnail image data for each independent image to the PC 13 or portable terminal. When separately transmitting the thumbnail image data corresponding to each independent image in the MP file 70, the MPU 27 reads the image data (miniaturized image data) of the thumbnail corresponding to each independent image from the MP file 70 upon receipt of a request for ID0x0005 and transmits the miniaturized image data corresponding to each thumbnail. Further, the MPU 27 may assign an ID to each independent image in the MP file 70 when assigning IDs to the image files in the memory card 33. In this case, a processing similar to that performed in the embodiments discussed above is performed to transfer the miniaturized image data of each thumbnail.

When the thumbnails in the MP file 70 are separately transferred, the CPU of the PC 13 may show the thumbnails of the MP file 70 in the same manner as the thumbnails of the SP files 40, 50, 60, and 80. Further, the MPU 27 may add identification information to the thumbnails of the MP file 70 to indicate that the thumbnails correspond to independent images. In this case, the CPU of the PC 13 can determine that the transmitted thumbnail is stored in the MP file 70. Thus, these thumbnails may be shown differently from the thumbnails of the SP files. For example, the CPU of the PC 13 may show the combined thumbnail 70*a* as shown in FIG. 11. Further, the color of the frame of a thumbnail may be changed, and the brightness of an image may be changed.

In the embodiments discussed above, the MPU 27 may read the image data corresponding to two or more images from the MP file 70 and combine the image data of the combined thumbnails to generate the combined thumbnail 70*a*. In this case, the MPU 27 may read the image data of every thumbnail in the MP file 70 and then write the header of the generated combined thumbnail 70*a*.

In the embodiments discussed above, a digital camera and a PC are used as examples of the first and second devices in the image data processing system. However, the first device may be another image capturing device such as a digital video camera or a cellular phone including an integrated camera. Further, the first device and the second device may both be PCs.

In the embodiments discussed above, an image data processing program may be stored in advance in an external storage medium such as a memory card. When the external storage medium is connected to the camera, an image data processing program may be retrieved into a memory of the camera from the external storage medium.

The present examples and embodiments are to be considered as illustrative and not restrictive, and the invention is not to be limited to the details given herein, but may be modified within the scope and equivalence of the appended claims.

What is claimed is:

1. An image data processing system comprising:
a first device that includes a data output unit, an image file generation unit, and a transfer processing unit; and
a second device that includes a specification data generation unit;
wherein the first device transfers image data of an independent image in an image file, which stores a plurality of independent images, to the second device;
the data output unit outputs combined miniaturized image data that contains a plurality of miniaturized images to the second device in response to a transfer request for image data, the combined miniaturized image data is generated by combining the plurality of miniaturized images and is used to show the plurality of miniaturized images in a combined state, the plurality of miniaturized images respectively correspond to the plurality of independent images in the image file, and each of the miniaturized images has a smaller data volume than the corresponding independent image;
the specification data generation unit generates transfer subject specification data based on the output combined miniaturized image data, and the transfer subject specification data specifies transfer subject image data that corresponds to a transfer subject independent image;
the image file generation unit generates a transfer image file storing the transfer subject image data based on the generated transfer subject specification data;
the transfer processing unit transfers the transfer image file to the second device;
the second device includes:
a display capable of showing a list of the miniaturized images; and
an external operation unit that is externally operated to specify a miniaturized image corresponding to the transfer subject independent image from the miniaturized images shown on the display in the list;
the transfer request for image data provided from the second device to the first device includes size information of the display;
the data output unit adjusts the combined miniaturized image data in accordance with the display size information and outputs the adjusted combined miniaturized image data to the second device; and
the display adjusts the size of each miniaturized image shown on the display in the list based on the output and adjusted combined miniaturized image data.

2. The system according to claim 1, wherein:
the first device further includes an image data generation unit that generates the combined miniaturized image data; and
the data output unit outputs the combined miniaturized image data generated by the image data generation unit to the second device.

3. The system according to claim 2, wherein:
the first device further includes a memory that stores the combined miniaturized image data generated by the image data generation unit; and
when the memory stores combined miniaturized image data corresponding to image data of which transfer is requested, the data output unit outputs the combined miniaturized image data corresponding to the requested image data in response to the transfer request.

4. The system according to claim 2, wherein the first device further includes:
an image capturing unit that captures an image of an object; and
a data storing unit that stores together, in a single image file, a plurality of independent images captured by the image capturing unit in relation with image data corresponding to each independent image;
wherein the image data generation unit generates the combined miniaturized image data based on the image data stored in the data storing unit.

5. The system according to claim 1, wherein:
the image file generation unit generates the transfer image file by extracting the transfer subject image data and excluding non-transfer subject image data from the image data in the image file in accordance with the transfer subject specification data; and
the transfer processing unit outputs to the second device the transfer image file from which non-transfer image data is excluded.

6. The system according to claim 1, wherein:
the image file includes a plurality of image data portions corresponding to the plurality of independent images;
the transfer subject specification data specifies one or more of transfer subject image data portions and one or more of non-transfer subject image data portions; and
the image file generation unit extracts from the image file the one or more of transfer subject image data portions in accordance with the transfer subject specification data to generate the transfer image file from which the one or more of non-transfer subject image data portions are excluded.

7. The system according to claim 1, wherein:
the data output unit outputs the combined miniaturized image data to the second device together with image evaluation information for each of the miniaturized images, which are shown in a combined state, in accordance with the combined miniaturized image data; and
the display shows the image evaluation information corresponding to each miniaturized image when showing the miniaturized images in a combined state.

8. A non-transitory computer-readable storage medium storing an image data processing program having instructions that cause an image data processing device to transfer image data of an independent image in an image file, which stores a plurality of independent images, the program when executed causing a controller of the image data processing device to perform steps comprising:
outputting combined miniaturized image data that contains a plurality of miniaturized images to an external device in response to a transfer request from the external device for image data, the transfer request including size information of a display, wherein the combined miniaturized image data is generated by combining the plurality of miniaturized images and is used to show the plurality of miniaturized images in a combined state, the plurality of miniaturized images respectively correspond to the plurality of independent images in the image file, each of the miniaturized images has a smaller data volume than the corresponding independent image, and the combined miniaturized image data is adjusted in accordance with the display size information;
receiving, from the external device, specification information specifying transfer subject image data, the specification information being generated based on the combined miniaturized image data;
generating, from the image file, a transfer image file including the transfer subject image data specified by the specification information; and
transferring the transfer image file to the external device.

9. An image data processing device that transfers image data of an independent image in an image file, which stores a plurality of independent images, the device comprising:
a data output unit that outputs combined miniaturized image data that contains a plurality of miniaturized images to an external device in response to a transfer request from the external device for image data, the transfer request including size information of a display, wherein the combined miniaturized image data is generated by combining the plurality of miniaturized images and is used to show the plurality of miniaturized images in a combined state, the plurality of miniaturized images respectively correspond to the plurality of independent images in the image file, each of the miniaturized images has a smaller data volume than the corresponding independent image, and the combined miniaturized image data is adjusted in accordance with the display size information,
a reception unit that receives, from the external device, specification information specifying transfer subject image data, the specification information being generated based on the combined miniaturized image data;
an image file generation unit that generates, from the image file, a transfer image file including the transfer subject image data specified by the specification information; and
a transfer unit that transfers the transfer image file to the external device.

* * * * *